J. B. MASON.
ROOST FOR FOWLS.
APPLICATION FILED APR. 20, 1908.
911,738.
Patented Feb. 9, 1909.
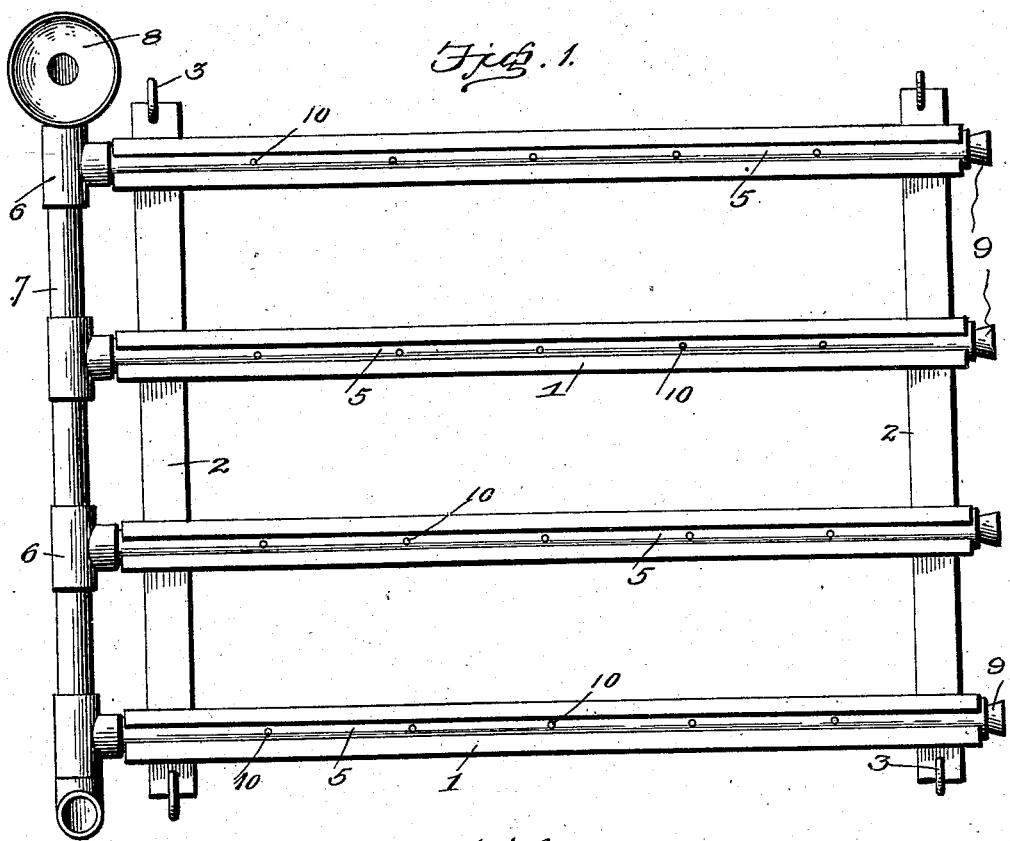
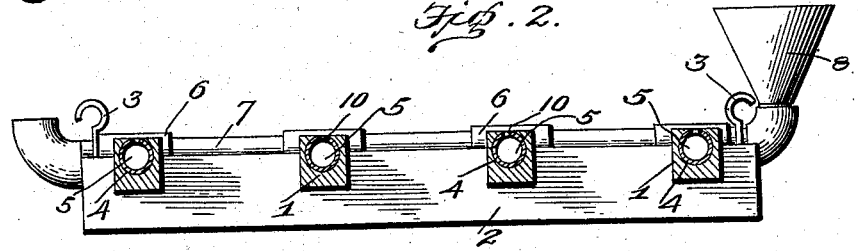
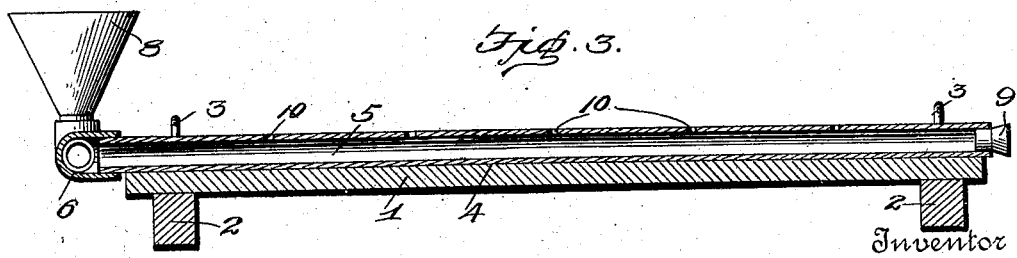
Witnesses
Inventor
John B. Mason

UNITED STATES PATENT OFFICE.

JOHN B. MASON, OF GOBLEVILLE, MICHIGAN.

ROOST FOR FOWLS.

No. 911,738.     Specification of Letters Patent.     Patented Feb. 9, 1909.

Application filed April 20, 1908. Serial No. 428,101.

*To all whom it may concern:*

Be it known that I, JOHN B. MASON, a citizen of the United States, residing at Gobleville, in the county of Van Buren and State of Michigan, have invented certain new and useful Improvements in Roosts for Fowls; and I do declare the following to be a full, clear, and exact description of the invention, such as will enable others skilled in the art to which it appertains to make and use the same.

This invention relates to improvements in roosts for fowls.

The object of the invention is to provide a roost having means whereby a vermin exterminator may be readily applied to each of the perches.

With this and other objects in view, the invention consists of certain novel features of construction, combination and arrangement of parts as will be described and particularly pointed out in the appended claim.

In the accompanying drawing, Figure 1 is a plan view of the roost showing the application of the invention thereto; Fig. 2 is a cross sectional view through the same; and Fig. 3 is a longitudinal sectional view through one of the perches showing the manner in which the exterminator distributing tube is arranged therein.

In the embodiment of the invention as shown in the accompanying drawing, 1 denotes the perches which are secured at their opposite ends to connecting bars, 2, which may be supported in any suitable manner, but which are here shown as provided at their opposite ends with hooks, 3, to which are adapted to be connected suitable supporting devices, not shown, whereby the roost is suspended in a horizontal position.

Each of the perches is provided in its upper edge with a longitudinally disposed groove or channel, 4, which extends throughout the length of the perch. The channels, 4, in the present instance are shown as circular in cross section to receive a distributing tube, 5, which extends therethrough, as shown. The tubes 5 are connected at one end to T-couplings, 6, whereby they are connected to a supply pipe, 7, having at one end a charging funnel, 8. The opposite ends of the tubes 5 are closed by suitable stoppers, 9, and in the upper edge of the tubes 5 is formed a series of small discharge passages, 10, through which the exterminating fluid is adapted to pass and run onto the perches, whereby the exterminating fluid is evenly distributed over the perches. The arrangement of the grooves or channels and the distributing tubes in the perches is such that the upper edges of the tubes are substantially flush with the upper surfaces of the perches.

While I have shown and described a particular construction and arrangement of perches, I do not wish to be understood as confining myself to this arrangement, as it is obvious that the perches may be arranged and supported in any suitable manner and the exterminator distributing tubes applied thereto. In using the device, the open ends of the tubes 5 are closed by the stoppers, 9, after which the vermin exterminator is poured into the charging funnel, 8, and from thence runs through the supply pipe, 7, and flows into each distributing tube, 5, from which it passes through the discharge openings therein and is evenly distributed over the perches. By keeping the perches saturated with an efficient vermin exterminator, the fowls will be kept free from vermin.

From the foregoing description, taken in connection with the accompanying drawings, the construction and operation of the invention will be readily understood without requiring a more extended explanation.

Various changes in the form, proportion and the minor details of construction may be resorted to without departing from the principle or sacrificing any of the advantages of the invention as defined in the appended claim.

Having thus described my invention, what I claim as new and desire to secure by Letters-Patent, is:

A roost for fowls comprising main supporting bars, a series of perches secured to said bars, said perches having formed therein longitudinally disposed cylindrical passages, said passages opening through the upper side of the perches, a series of distributing tubes arranged in and adapted to fit said passages, said tubes projecting beyond the opposite ends of said perches and having formed in their upper side a series of perforations communicating with the open upper side of the perches, a supply pipe connected to one end of said tubes, and removable stoppers arranged in the opposite end of each of the tubes whereby the latter may be readily cleaned.

In testimony whereof I have hereunto set my hand in presence of two subscribing witnesses.

JOHN B. MASON.

Witnesses:
C. OLNEY,
H. M. HUFF.